March 18, 1941.    N. R. SPARKS    2,235,089
MODULATED STEADY STATE REFLECTION SEISMIC SURVEYING
Filed Jan. 14, 1939    2 Sheets-Sheet 1
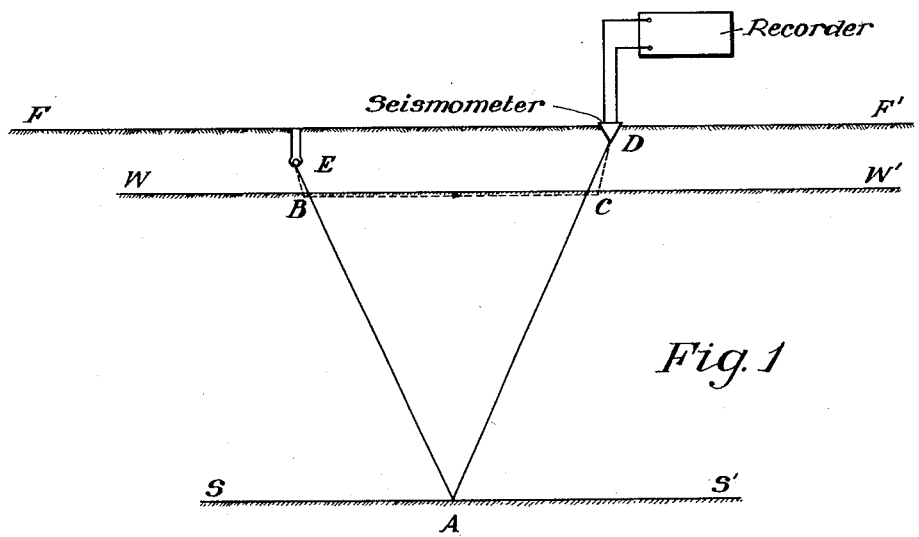
Fig. 1
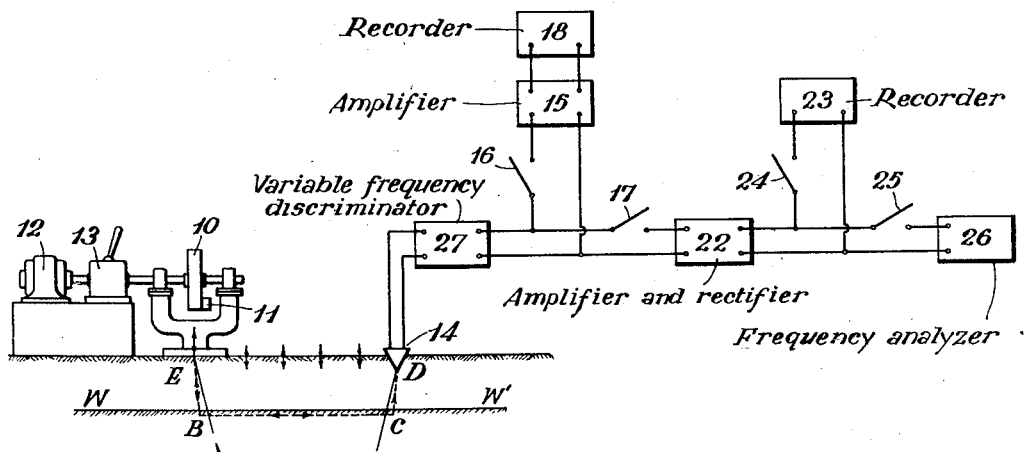
Fig. 2
INVENTOR
Neil R. Sparks
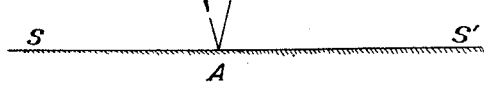
ATTORNEY Patented Mar. 18, 1941

2,235,089

UNITED STATES PATENT OFFICE 2,235,089

MODULATED STEADY STATE REFLECTION SEISMIC SURVEYING

Neil R. Sparks, Tulsa, Okla., assignor to Stanolind Oil and Gas Company, Tulsa, Okla., a corporation of Delaware Application January 14, 1939, Serial No. 250,980

5 Claims. (Cl. 181—0.5)

This invention relates to a new method of seismic surveying and more particularly to a method of utilizing modulated steady state vibrations.

In most of the successful applications of seismic technique use has been made of waves of a transient character usually created by an explosive charge and apparatus has been employed primarily adapted to the purpose of measuring the time of transit of such waves from the explosive source down to a stratum and back to the surface of the ground.

From a knowledge of the average velocities to given depths and the times of transit from source to receiver computations are made as to depth, dip, or other characteristics of the subsurface structures.

The transitory character of the seismic wave in this method of recording makes it imperative to use comparatively high speed photographic means of recording the waves and the danger from high explosives is apparent to anyone who is conversant with such matter.

It is an object of my invention to provide a method of seismic surveying which will avoid the necessity of using such explosive charges and permit the efficient use of steady state vibrations in a manner such that the wave phenomena can be observed in the field for as long a period of time as desired.

Another object of my invention is to provide a new and improved method of seismic surveying utilizing steady state waves whereby the recognition and interpretation of reflected seismic waves is facilitated.

Other and more detailed objects, advantages and uses of my invention will become apparent as the description thereof proceeds.

In brief my invention has to do with the generation of steady state forces which are impressed upon the ground, the detection of the resulting motions of the earth at a point removed from the generator, and the employment of novel means for measuring the time of transit from the source to the underground strata and back to the detecting device.

My invention will be better understood with reference to the following drawings and explanations thereof which deal with certain specific embodiments of the invention and in which:

Figure 1 is a diagrammatic illustration of paths of seismic waves where explosives are used as a source of energy;

Figure 2 is a diagram illustrating the corresponding situation utilizing my invention;

Figure 3:
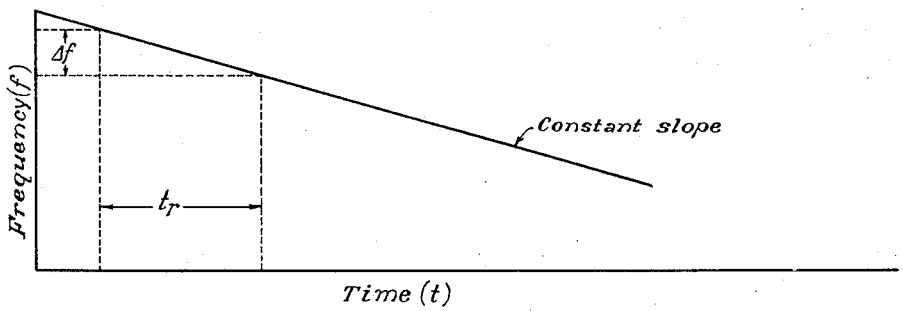
Figure 3 is a diagram showing the frequency of the vibrator as a function of time.

Referring to Figure 1 which represents the wave paths of the transient wave system the source of the wave or point of explosion is represented by point E, the surface of the earth by F—F'. W—W' represents the interface between the unweathered and weathered layers while S—S' represents an underground stratum from which the reflected wave is received.

As is well known in the art, the first impulse to arrive at the detector is via a relatively direct path such as the path E—D or the path E—B—C—D depending on the distances and velocities involved, while the wave reflected by the bed S—S' travels a longer time path and arrives at detector D at some time subsequent to the arrival of the first wave. The time interval between these arrivals is dependent upon the lengths of the paths and the average velocities of the media traversed by these waves.

Now if the explosive E is replaced by a steady state shaker which imparts a motion to the ground of a form hereinafter described the paths of the waves will be the same as above indicated for the transient wave and likewise the first wave to arrive at the detector will ordinarily be via the direct path E—D, while the wave arriving via path E—A—D will be later by an amount of time dependent upon depth and the average velocity characteristic of the materials over the path of the wave.

For the simple case a record could be made of the steady state combination of direct and reflected waves as detected by a seismometer placed at D. Assuming that the frequency of the source were constant and that no other waves were present, the recorded wave would be the algebraic sum of the two waves. The wave proceeding via path E—A—D would be shifted in phase and attenuated due to its delay and the resultant combination would be another sine wave which would be theoretically impossible to analyze as the shape of the resultant wave would depend upon both phase shift and amplitude.

In actual practice such a method would be still further complicated, since the wave is more complex than stated, due to the fact that waves proceed from the generator E via all available paths including a plurality of reflecting horizons and the recording is a composite of all these waves.

I have found, however, that if we vary the frequency of the generating source E in a manner that is some known function of time then we have a means of determining the depth of stratum S—S'. This can be demonstrated in a general way by the following mathematical analysis.

Let us assume that we have a vibrator that imparts a sinusoidal force to the ground such that the vertical motion of the earth surface is $$Z = A \sin \omega_1 t$$

where $A$ = maximum amplitude of the ground due to the vibrator,
$\omega_1 = 2\pi f$ where $f$ = frequency of vibration forces, and
$t$ = time.

After the wave has traversed the path from the source down to the reflection bed and back to the detector the resultant motion due to this reflection is:

$$Z = A_r \sin \omega v(t - t_r)$$

where $A_r$ = Maximum amplitude of reflection arriving at surface of ground,
$\omega_r$ = Angular frequency of the generator at time $(t - t_r)$ or the frequency of the generator at a time $t_r$ seconds before the wave arrives at the surface of the ground, and
$t_r$ = travel time of reflected wave from source to the detector.

Now if we vary the frequency of the generator in accordance with some known function of time the angular velocity of the generator at any given instant will be:

$$\omega = \omega_0 + f(t) \qquad (1)$$

where $\omega_0$ = angular velocity of generator at zero time, and
$f(t)$ = known function of time.

Assuming that the time of transit from the generator direct to the detector is negligible then the angular velocity of the direct wave $\omega_1$ reaching the detector at a given instant of time $t_1$ will be $$\omega_1 = \omega_0 + f(t_1) \qquad (2)$$

and the wave reaching the detector via the reflection path will be of an angular velocity:

$$\omega_r = \omega_0 + f(t_1 - t_r) \qquad (3)$$

where $t_r$ = time required for the wave to traverse the reflection path.

The difference in the angular velocities of these two waves at the instant they reach the detecting device will be:

$$\omega_1 - \omega_r = f(t_1) - f(t_1 - t_r) \qquad (4)$$

These two waves will generate in the detector two voltages of amplitudes $E_1$ and $E_r$ and of angular velocities $\omega_1$ and $\omega_r$ superimposed so that the instantaneous voltage is:

$$V = E_1 \sin \omega_1 t + E_r \sin [(\omega_r + \alpha_1) t + \phi_1] \qquad (5)$$

where $\phi_1$ is the phase angle and $\alpha = \omega_1 - \omega_r$.

The envelope of this composite wave can be found in the usual manner (see Electronics, November 1930, page 387) and takes the form of:

$$E_1^2 + E_r^2 + 2E_1 E_r \cos(\alpha_1 t + \phi_1) \qquad (6)$$

From Equation 4 and the definition of $\alpha_1$ we see that:

$$\alpha_1 = \omega_1 - \omega_r = f(t_1) - f(t_1 - t_r) \qquad (7)$$

Substituting (7) into (6) we have:

$$\text{Envelope} = E_1^2 + E_r^2 + 2E_1 E_r \cos \{[f(t_1) - f(t_1 - t_r)]t + \phi_1\} \qquad (8)$$

Now for a special case let:

$$f(t) = kt \qquad (9)$$

Substitution of (9) into (8) we have:

$$\text{Envelope} = E_1^2 + E_r^2 + 2E_1 E_r \cos[(kt_1 - kt_1 + kt_r)t + \phi_1]$$

and the amplitude of this heterodyne signal would be:

$$\sqrt{E_1^2 + E_r^2 + 2E_1 E_r \cos k t_r t} \qquad (10)$$

When this wave is rectified by means of a square law detector we obtain a direct current $E_1^2 + E_r^2$ and an alternating current of a maximum amplitude $2E_1 E_r$ and a frequency:

$$2\pi f = k t_r \qquad (11)$$

and as $t_r$ is a constant for any particular reflection bed the beat frequency resulting from a reflection from such a reflecting bed would be constant and proportional to the time of travel of the reflected wave over the reflection path to that bed and back to the detecting device.

Likewise, beat frequencies resulting from reflections from other beds would be constants but of different values proportional to their depths below the source of the vibrations.

It can readily be seen that by utilizing any of the well known methods of analyzing the beat frequencies; for example, by a harmonic analyzer or frequency meter, we have a ready means for computing the depth of the strata from their characteristic beat frequencies $(\omega_1 - \omega_r)$ for each reflection time $t_r$.

Of course, it is a physical impossibility continuously to increase or decrease the frequency of the source of vibrations in accordance with the particular function of time $f(t)$ used but the beat frequency is the same whether this function is positive or negative. Therefore, the same result is obtained if the frequency is alternately increased and decreased in accordance with the particular function of time used for operation of the device.

It will also be entirely satisfactory to work over a finite period of time range either with increasing or decreasing frequency; for example, the frequency of the vibrator can be brought up to a given value and the power disconnected so as to allow it to die down. When the vibrator is an unbalanced fly wheel the decaying frequency will bear a substantially straight line relation with respect to time over a sufficient range of frequencies for practical operation.

We thus find that we have a means for measuring the time of transit of a wave over a reflection path in terms of frequency and that the method is independent of amplitude of the reflected wave, the only requisite being that the amplitude should be sufficient to produce beat frequencies that can be detected and analyzed.

Turning now to Figure 2, a vibrator 10 is held in contact with the earth by its own weight or other means. As shown, this vibrator can be a flywheel which is out of balance by virtue of an unbalanced weight 11. I have found that when such a flywheel is brought up to speed and the operating force is removed its frequency decays substantially as a straight line function with respect to time over a considerable range as shown, for instance, in Figure 3 in which the curve of frequency versus time shows a constant slope. The unbalanced flywheel or other vibrator can be driven by various means, for instance by a synchronous motor 12 through a clutch 13. The frequency of the input to the motor can be controlled in various well known ways, for instance by a vacuum tube oscillator.

A seismometer 14 picks up both the direct vibrations traveling from vibrator 11 through the surface of the earth and reflected vibrations traveling along path E—A—D. The direct wave and the reflected waves will, of course, have greatly different travel times and this difference in time is represented by $t_r$ in Figure 3. This $t_r$ corresponds to a $\Delta f$ as shown or, in other words, the frequency of the direct and reflected waves will differ by this amount.

Figure 4:
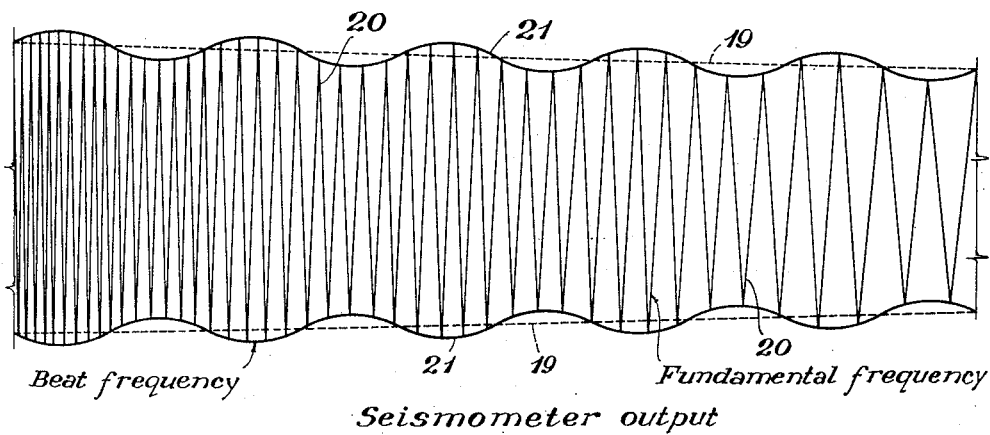
Figure 4 shows an idealized diagram illustrating the wave phenomena recorded in recorder 18 of Figure 2.

These waves picked up by seismometer 14 can be amplified in amplifier 15 (switch 16 being closed and switch 17 open) and the amplified waves can pass to a recorder 18 which can be of the oscillograph type. An idealized diagram illustrating the resultant beat frequency waves produced by this recorder is shown in Figure 4. Dashed lines 19 show the average amplitude of the direct waves which, of course, diminishes with time. The idealized incoming waves are represented by the record lines 20 of decreasing frequency. While the envelope 21 of these waves would not be shown as such in the record, it has been drawn in Figure 5 and reveals the fact that there is a beat frequency of $2\pi f$ which, as shown in Figure 4 is a function of the difference in travel time between the direct and reflected waves, and, therefore, for a given vibrator to seismometer distance and given velocities of wave travel in the sub-surface formations the beat frequency is a measure of the depth of the reflecting formation S—S.

Similar beats are formed between the refracted and reflected waves and can be similarly measured although it is sometimes desirable to place seismometer 14 sufficiently close to vibrator 10 to eliminate the refracted waves for all practical purposes.

Figure 5:
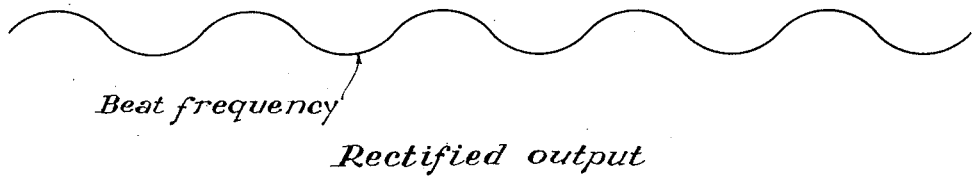
Figure 5 shows an idealized diagram illustrating the wave phenomena recorded by recorder 23 in Figure 2.

Records of the type produced by recorder 18 are, of course, very difficult to interpret and it is, therefore, preferable to leave switch 16 open and close switch 17, passing the electrical signals generated by seismometer 14 through amplifier and rectifier 22 (preferably a square law rectifier) to a recorder 23 (switch 24 being closed and switch 25 open). Recorder 23, like recorder 18, may be an oscillograph camera type of instrument. Having chosen suitable amplifiers and rectifiers, the beat frequency is removed from the fundamental frequency and the rectified output produced by recorder 23 would in an ideal case be as shown in Figure 5.

For purposes of simplicity we have so far discussed only a single reflecting horizon and only a single seismometer. It should be understood, of course, that in practice many reflecting horizons are encountered and complications are also encountered due to refracted and other types of waves. Further, a plurality of seismometers is also advantageous, particularly if dip as well as depth of the reflecting horizons are to be determined.

Accordingly I prefer to pass the signals from amplifier and rectifier unit 22 to a frequency analyzer 26 instead of to recorder 23. Various types of frequency analyzers are known and can be used to separate out the various complex frequencies from the signals entering the frequency analyzer in order to determine and measure beat frequencies corresponding to reflecting horizons.

It is desirable to simplify the records produced by introducing a variable frequency discrimination device 27 between seismometer 14 and recorder 18 or amplifier and rectifier 22 in order to eliminate frequencies other than those corresponding to the direct and reflected waves. Such a variable frequency discrimination device can be controlled by vibrator 10 or otherwise in accordance with the frequencies generated by this vibrator.

The frequencies used can be varied throughout a considerable range. The maximum frequency used should not exceed 500 vibrations per second and practically, due to mechanical limitations on the vibrator, it should not exceed 200 vibrations per second. The minimum frequency used should be above 10 vibrations per second and preferably above 30 vibrations per second. In a specific case I have found it feasible to use a frequency of about 150 vibrations per second dying down to approximately 50 vibrations per second.

These practical limitations as to frequencies which can be used in actual field work may place difficulties in the way of detecting and analyzing the resulting combination waves. This difficulty can be overcome by first recording the waves as they come from the detecting device using any of the well known recording methods and then reproducing them at higher speeds for analytical purposes. The time obtained at the higher speed of analysis can then be multiplied by a constant equal to the ratio of the high speed reproduction to the low speed recording.

Although the circuits used have not been described, it will be apparent that more or less conventional equipment can be employed. The amplifiers and rectifiers can be similar to those used in the radio art, the seismometers and oscillograph cameras can be of the types familiar in seismic surveying and suitable frequency discrimination devices, control circuits and wave analyzers are well known.

While I have described my invention in connection with certain specific embodiments thereof, it is to be understood that this is by way of illustration and not by way of limitation and I do not mean to be bound thereby but only to the scope of the appended claims which should be construed as broadly as the prior art will permit.

I claim:

1. A method of seismic surveying comprising generating steady state seismic vibrations in the earth, continuously varying the frequency of these vibrations substantially as a known function of time, receiving reflected waves and relatively direct waves thus generated and determining at least one beat frequency between said relatively direct and said reflected waves.

2. A method of seismic surveying comprising generating steady state seismic vibrations in the earth, varying the frequency of these vibrations substantially as a straight line function with respect to time, receiving reflected waves and relatively direct waves thus generated and determining at least one beat frequency between said relatively direct and said reflected waves.

3. A method of seismic surveying comprising generating steady state seismic vibrations in the earth, varying the frequency of these vibrations substantially as a straight line function with respect to time, receiving refracted and reflected waves thus generated and determining at least one beat frequency between said refracted and said reflected waves.

4. A method of reflection seismic surveying comprising generating steady state seismic vibrations in the earth, such steady state vibrations varying in frequency substantially as a straight line function with respect to time, picking up direct and reflected waves at a point in the vicinity of the point of generation of said vibrations, transforming the vibrations thus received into electrical vibrations, amplifying and rectifying said electrical vibrations and recording said amplified and rectified vibrations whereby at least one beat frequency is determined and whereby the depth of at least one reflecting horizon can be calculated.

5. A method of reflection seismic surveying comprising generating steady state seismic vibrations in the earth, such steady state vibrations varying in frequency substantially as a straight line function with respect to time, picking up direct and reflected waves at a point in the vicinity of the point of generation of said vibrations, transforming the vibrations thus received into electrical vibrations, amplifying and rectifying said electrical vibrations and analyzing said amplified and rectified vibrations to determine at least one beat frequency.

NEIL R. SPARKS.